United States Patent [19]
Grammer

[11] Patent Number: 6,164,681
[45] Date of Patent: Dec. 26, 2000

[54] AUTOMATIC HITCH COUPLER

[76] Inventor: Val Grammer, 1711 Neelys Bend, Madison, Tenn. 37115

[21] Appl. No.: 09/168,766

[22] Filed: Oct. 8, 1998

[51] Int. Cl.⁷ ........................................................ B60D 1/06
[52] U.S. Cl. ............................................ 280/508; 280/512
[58] Field of Search .................................... 280/504, 508, 280/509, 510, 511, 512, 514, 477, 478.1, 479.3

[56] References Cited

U.S. PATENT DOCUMENTS

| | | | |
|---|---|---|---|
| 2,191,749 | 2/1940 | Brown | 280/500 |
| 2,552,885 | 5/1951 | Claud-Mantle . | |
| 3,695,630 | 10/1972 | Zucca | 280/474 |
| 3,773,356 | 11/1973 | Eichels et al. | 280/477 |
| 3,860,267 | 1/1975 | Lyons | 280/478.1 |
| 3,909,033 | 9/1975 | Russell | 280/477 |
| 4,226,438 | 10/1980 | Collins | 280/477 |
| 4,417,748 | 11/1983 | Dortch | 280/477 |
| 4,657,275 | 4/1987 | Carroll | 280/477 |
| 4,792,151 | 12/1988 | Feld | 280/509 |
| 4,903,978 | 2/1990 | Schrum | 280/477 |
| 5,161,815 | 11/1992 | Penor, Jr. | 280/477 |
| 5,547,210 | 8/1996 | Dugger | 280/477 |
| 5,951,036 | 9/1999 | Sargent | 280/477 |

OTHER PUBLICATIONS

"Quick 'N Easy Receiver Hitch by DMI", Advertisement, Trucking Times & Sport Utility News, Directory Issue, 1998.

"One Step" Advertisement, Trucking Times & Sport Utility News, Mar./Apr. 1998.

"Close Enuf Stinger Hitch System" Advertisement, Trucking Times & Sport Utility News, Jul.,/Aug. 1998.

"Rosto–Eze Universal Towing Accessory" Advertisement, SEMA News, vol. 30, No. 1, Jan. 1998.

*Primary Examiner*—Paul N. Dickson
*Assistant Examiner*—Avraham H. Lerner
*Attorney, Agent, or Firm*—Lucian Wayne Beavers Waddey & Patterson

[57] ABSTRACT

A pivotal guide for a trailer hitch which guides a trailer socket to engage a hitch ball when the user forces the trailer guide to engage the trailer socket. A base plate is pivotally connected to a hitch bar, which when a trailer tongue engages a base plate the hitch ball attached to the base plate is raised to be positioned directly below the trailer socket. The base plate has a pair of guiding walls for horizontal positioning of the trailer socket. The guide further has two locking devices for securing the base plate to the hitch bar. A second locking procedure is one in which a latch and latch receiver are attached between the base plate and the hitch bar respectively, thereby allowing the base plate to automatically be secured with the hitch bar when the base plate is in the final position.

18 Claims, 5 Drawing Sheets

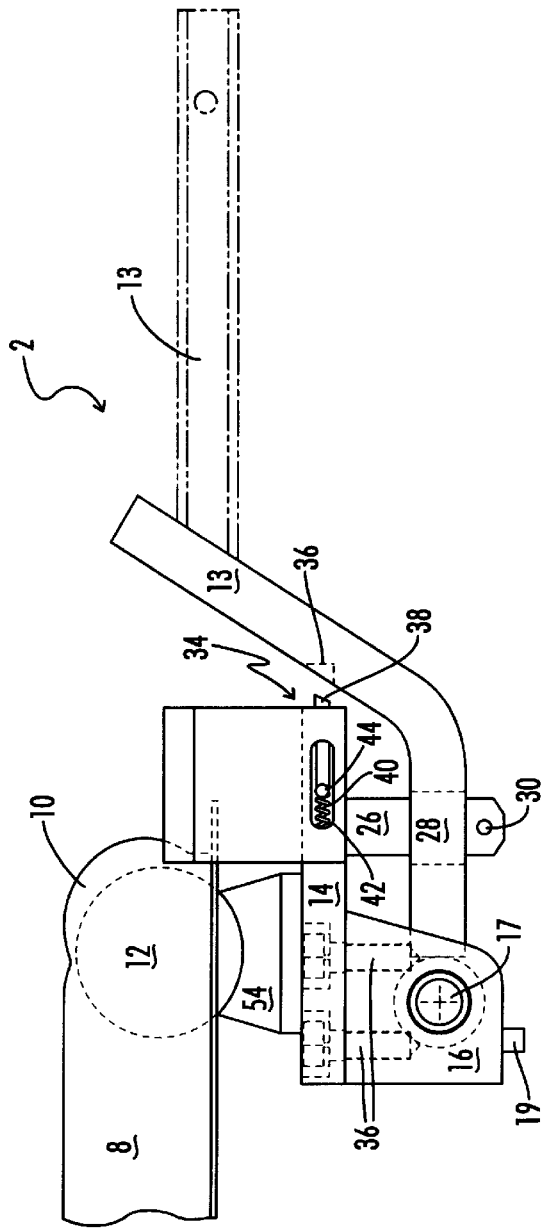
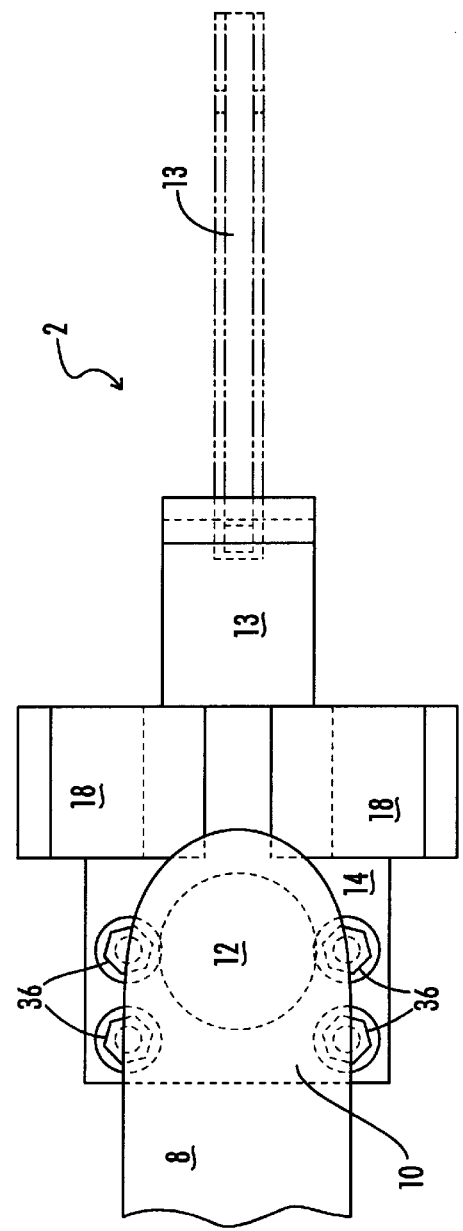
FIG. 1
FIG. 2

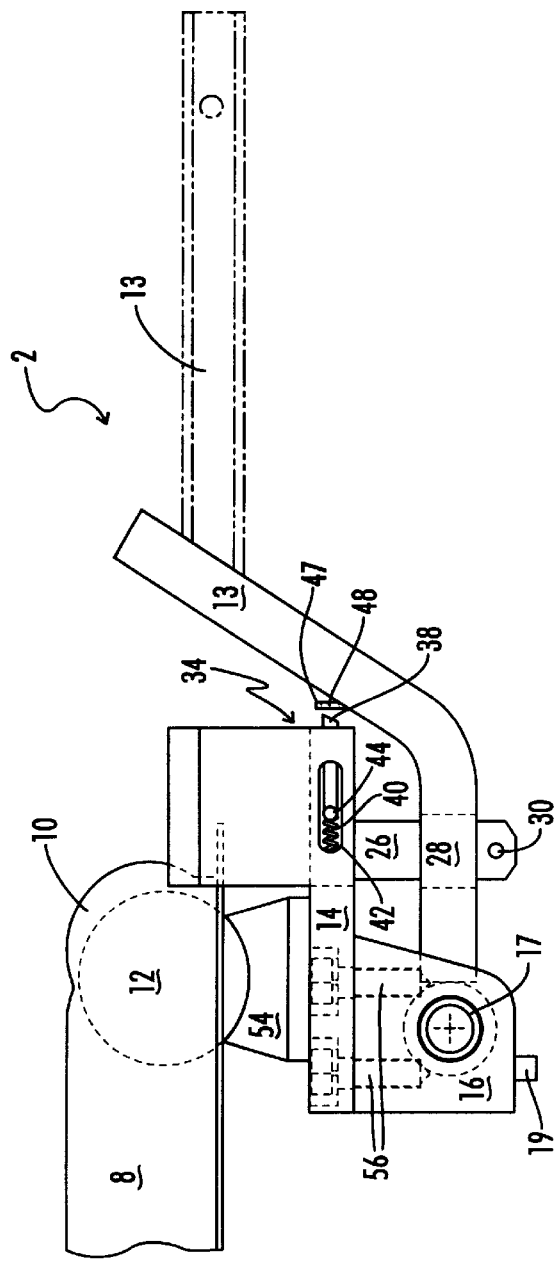
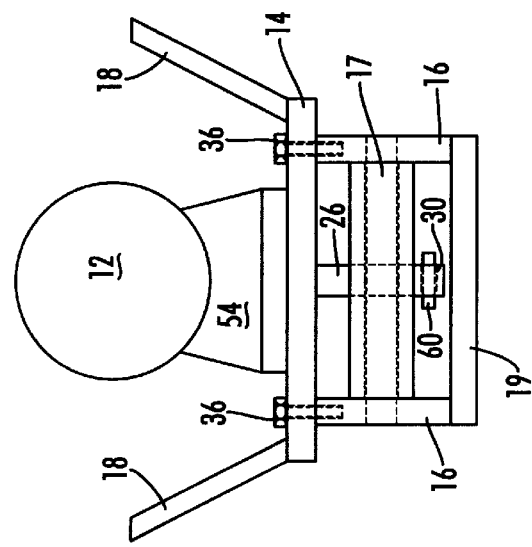
FIG. 4
FIG. 5

AUTOMATIC HITCH COUPLER

BACKGROUND OF THE INVENTION

The present invention relates generally to a trailer hitching apparatus and more particularly to a trailer hitching apparatus for automatically coupling a hitch ball to a trailer tongue. Recreational trailers are commonly used to pull boats and other heavy vehicle and towing items. A problem that commonly occurs is when a person is attempting to connect a hitch ball located on the rear frame of a vehicle and the person operating the vehicle is not able to clearly see the position of the trailer with respect to the trailer tongue. Therefore, as the person is attempting to connect the trailer with the hitch ball, the person often must go through a trial and error process for aligning the trailer to the hitch ball. The person often has to approximate the alignment of the trailer to the hitch ball and the distance between the trailer and the vehicle. Such a process requires the person to constantly leave the driving position in the vehicle to see if the hitch ball is in the correct position with respect to the trailer so that the trailer will connect with the hitch ball.

Previous designs have attempted to aid the sole person in hitching a trailer to a hitch ball attached to a vehicle. Such inventions include U.S. Pat. No. 4,903,978 issued to Schrum, which is a self-aligning trailer hitch that allows a towing vehicle hitch assembly to guide a trailer onto a hitch ball through using a series of brackets attached to the towing vehicle. The disadvantages to such a complex and elaborate assembly is that it is complicated for the user to attach to the vehicle and it is also difficult to properly use the apparatus with a conventional towing trailer.

Another device designed as a trailer hitch guide is described in U.S. Pat. No. 3,773,356 issued to Eichels, et al. The trailer hitch guide is used to guide the trailer to a position over the ball so that the trailer hitch will fall into place on the hitch ball when lowered down. This invention implements a V-shaped guide member to position the trailer above the hitch ball, so that when lowered, the trailer will be over the hitch ball. The base plate must be moved forward or backward to correct the position of the device relative to the ball. Thus, the V-shaped guide member does guide the trailer to be positioned above the ball. However, such an invention does not automatically couple the hitch ball with the trailer socket, which still causes the user to estimate when the trailer is over the hitch ball when hitching a trailer alone.

What is needed then is an apparatus for engaging a hitch ball to a trailer socket without requiring the user to constantly leave the user's vehicle to analyze the position of the trailer with respect to the hitch ball.

SUMMARY OF THE INVENTION

The present invention provides an apparatus for coupling a trailer socket with a hitch ball. The present invention is designed to enable one person, with reasonable accuracy, to be able to hook up a trailer on the first try, which avoids the frustration normally associated with attempts to hook up the trailer by a sole person. The apparatus includes a hitch bar that is adapted to be received by the trailer socket of a vehicle, and a base plate that is pivotally connected to the hitch bar. A hitch ball is further mounted to the base plate. Since the base plate is pivotable relative to the hitch bar, the base plate may be swiveled between a receiving position for engaging the trailer and a locked position wherein the trailer socket is engaged with the hitch ball to secure the trailer so that the vehicle may tow the trailer. The base plate is positioned vertically so as to make contact with the trailer socket when the user is backing the towing vehicle towards the trailer. While the base plate is in the receiving position, the base plate makes contact with the trailer tongue. A trailer coupler latch is further attached to the trailer to also make contact with the hitch ball, and to aid in positioning the base plate. As the apparatus is moved toward the trailer, the trailer tongue continues to engage the base plate and to pivot towards a horizontal final, locked position. When the pivot plate finally comes to such a position, the hitch ball is sufficiently engaged with the trailer socket.

The apparatus additionally has a pair of guiding walls that are attached to the base plate. These guiding walls serve to position the trailer socket over the hitch ball as the base plate is pivoted into the final position.

The automatic hitch coupler further has a locking tab attached to the bottom of the base plate. The locking tab extends toward the hitch bar so that when the base plate is in the final position, the locking tab will be able to penetrate the hitch bar through a locking tab hole. A locking pin hole is located in the locking tab, which when the base plate is in the final position, a pin or lock can be inserted through the locking pin hole to secure the base plate in its final position.

The automatic hitch coupler also includes a latch and a latching receiver for automatically securing the base plate to its final position when it is rotated from the receiving position to the final position. In the first embodiment, the latch includes a strike pin which is located in the base plate. A strike pin spring is connected between the strike pin and the base plate. The strike pin spring serves to force the strike pin out of the base plate. When the base plate is pivoted from the receiving position to the final position the strike pin will come in contact with the latch receiver. The latch receiver can either be inside the hitch bar, or it can be a tab mounted to the hitch bar which has a strike pin receiving hole positioned on the tab. Furthermore, there is a strike pin release hole on the side of the base plate corresponding with the position of the strike pin. A strike pin arm that is attached to the strike pin extends from the strike pin through the strike pin release hole. Therefore, when the base plate is in the final position and the strike pin is inserted into the latch receiver, pressure can be applied to the strike pin arm to receive the strike pin from the latch receiver, thereby allowing the base plate to move from the final position to the receiving position and allow the user to use the automatic hitch coupler to go and retrieve another trailer. In a second embodiment, the strike pin extends through the hitch bar and the latch receiver is installed inside the base plate. The latch pin is held in position by a latch pin holding cylinder mounted to the inside surface of the hitch bar, whereby the strike pin spring is between the latch pin holding cylinder and the latch pin. The latch pin is thereby directed toward the base plate to engage the latch when the base plate is pivoted to the locked position. The latch pin can be released from the latch by pulling the pin handle.

BRIEF DESCRIPTION OF THE DRAWINGS

FIG. 1 is a side view of the automatic hitch coupler, with a hitch ball in the locked position.

FIG. 2 is a top view of the automatic hitch coupler, with the hitch ball in the locked position.

FIG. 3a is a side view of the automatic hitch coupler in the receiving position.

FIG. 3b is a side view similar to FIG. 3a, with the hitch coupler engaging the trailer.

FIG. 3c is a side view similar to FIG. 3a, with the hitch coupler engaging the trailer.

FIG. 3d is a side view similar to FIG. 3a, with the hitch coupler engaging the trailer.

FIG. 3e is a side view similar to FIG. 3a, with the hitch coupler engaging the trailer.

FIG. 3f is a side view similar to FIG. 3a, with the hitch coupler engaging the trailer.

FIG. 4 is a side view of the automatic hitch coupler in the locked position, the hitch ball coupler using a strike pin receiving tab to lock the apparatus.

FIG. 5 is a front view of the base and guiding walls of the automatic hitch coupler.

DESCRIPTION OF THE PREFERRED EMBODIMENTS

Figure 3A:
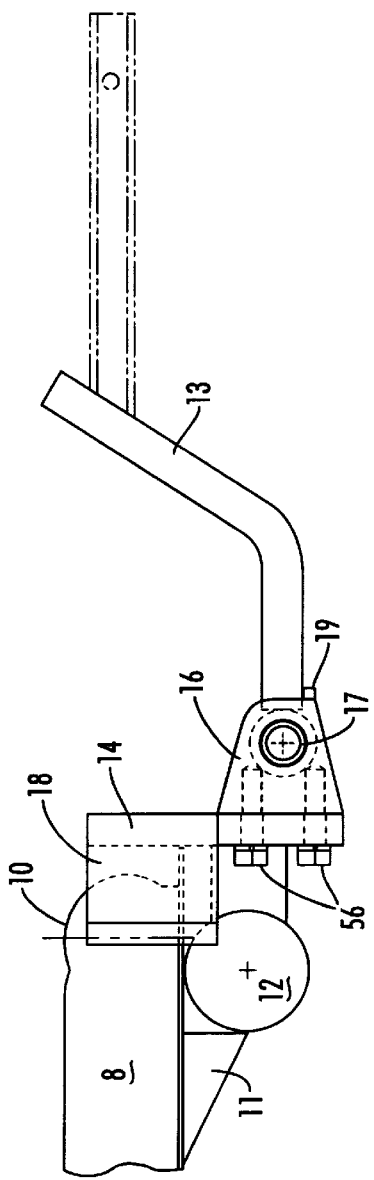
FIGS. 3a–3f comprise a sequential series of side views of the automatic hitch coupler showing the coupler moving from the receiving position to the final position.
Figure 3B:
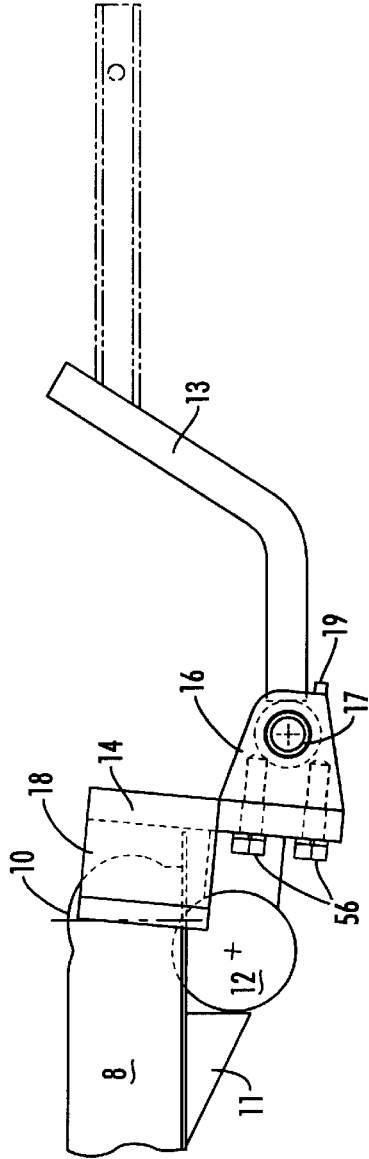
Figure 3C:
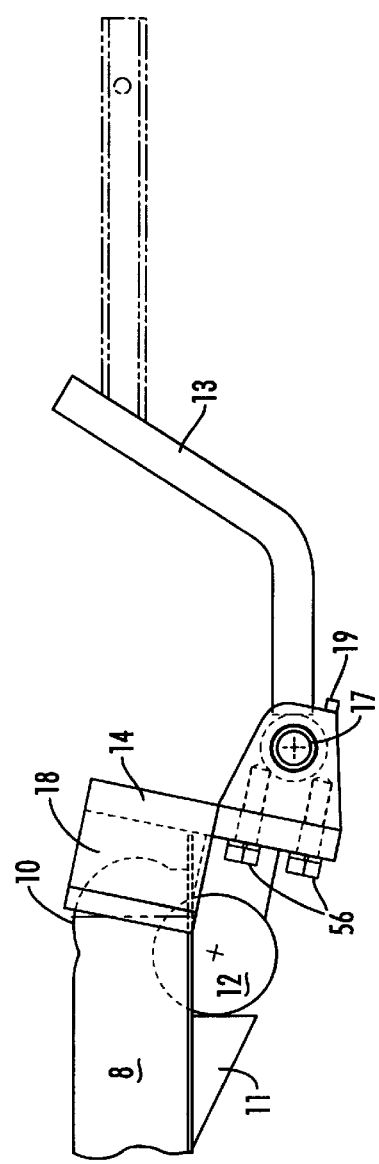
Figure 3D:
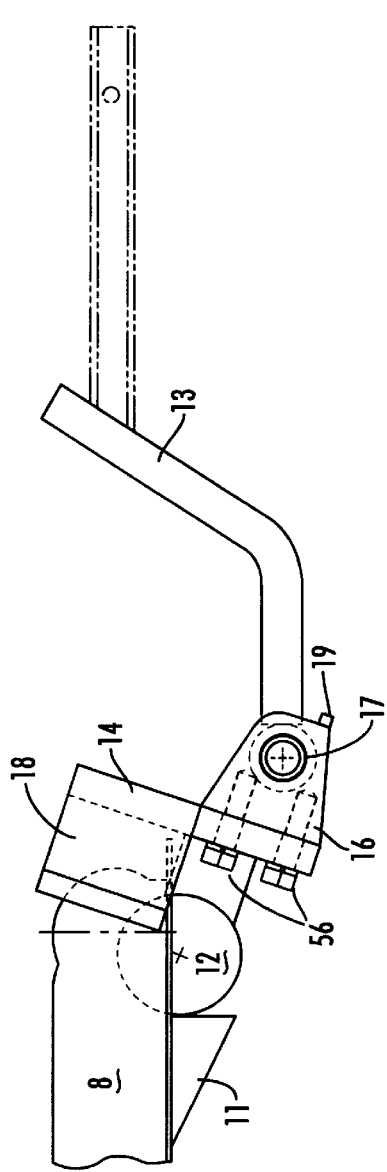
Figure 3E:
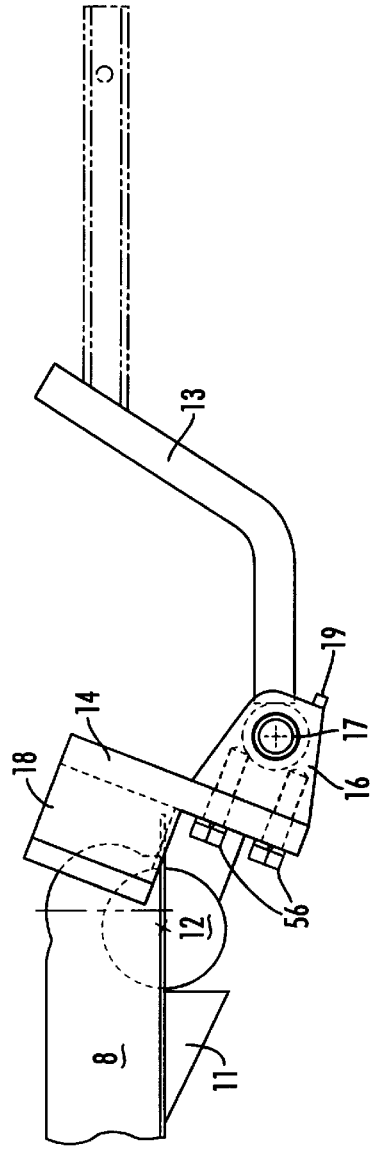
Figure 3F:
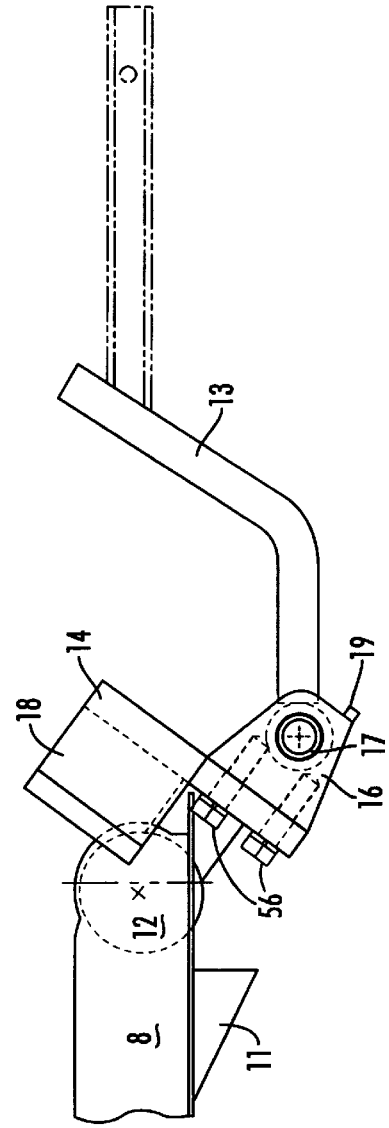

FIG. 1 is a side view of the automatic hitch coupler 2. The automatic hitch coupler 2 includes a base plate 14 that is designed to engage a trailer socket 10 to lock a trailer 8 to a vehicle (not shown). The automatic hitch coupler 2 is attached to the vehicle so that when the vehicle is backed towards the trailer 8, trailer socket 10 of the automatic hitch coupler 2 is designed to be coupled with the trailer socket 10 when the automatic hitch coupler 2 engages the trailer socket 10. This allows the user to easily and automatically be able to couple the trailer socket 10 with the hitch ball 12.

The hitch ball 12 is mounted to the base plate 14, and a collar 54 is positioned between the hitch ball 12 and the base plate 14. The hitch ball 12 can be of any standard size, such as 1⅞ inches, 2 inches, or 2 5/16 inches, and is inserted into the conventionally sized trailer socket 10. Further, the hitch bar 13 can preferably be further mounted in a standard three-quarter inch to two inch towing receiver (not shown) on the vehicle. Furthermore, the hitch bar 13 typically has a drop of 0 inches, 2 inches, 4 inches, or 6 inches. The base plate 14 is pivotally attached to the hitch bar 13 via the side flanges 16. The side flanges 16 can be attached to the base plate 14 in a plurality of ways, such as through a set of mounting bolts 56 or through a welded connection. The connection between the hitch bar 13 and the side flanges 16 is made via a pivoting cylinder 17. The pivoting cylinder 17 is attached to the hitch bar 13, and further has two ends, with each end of the pivoting cylinder 17 engaging one of the side flanges 16 to allow rotation around the axis of the pivoting cylinder 17. This embodiment further includes a stopping bar 19 which is connected to each of the side flanges 16. The stopping bar 19 is positioned so that when the base plate 14 is pivoted about the pivoting cylinder 17, the stopping bar 19 will come in contact with the hitch bar 13. This contact between the stopping bar 19 and the hitch bar 13 prevents the base plate 14 from pivoting beyond the receiving position around the pivoting cylinder 17.

The automatic hitch coupler 2 additionally includes a pair of guiding walls 18 attached to the base plate 14, as shown in FIG. 5. The guiding walls 18 serve to position the trailer socket 10 to engage the hitch ball 12 as the base plate 14 is pivoted into the final position. If the trailer socket 10 is not correctly positioned to engage the hitch ball 12, the guiding walls 18 will direct the trailer socket 10 toward the center of the base plate 14 to be in position to engage the hitch ball 12. If the alignment is off by approximately 2 inches either way in the horizontal direction, the guiding walls 18 will align the ball 12 of the automatic hitch coupler 2 to receive the tongue of the trailer 10.

The interaction between the automatic hitch coupler 2 and the trailer socket 10 can more clearly be seen in FIGS. 3a–3f, as the automatic hitch coupler 2 moves from a receiving position to a locked position. FIG. 3a shows the automatic hitch coupler 2 in the receiving position, with the base plate 14 being substantially vertical. The positioning of the base plate 14 allows the base plate 14 to contact the trailer socket 10 substantially within the region of the guiding walls 18. As the hitch ball 13 is continued to be pushed towards the trailer socket 10, the base plate 14 is pivoted corresponding to the connection between the side flanges 16 and the hitch bar 13. Additionally, a trailer coupler latch 11 is attached to the trailer 8 to further engage the hitch ball 12 and help to pivot the base plate 14. Correspondingly, the region of the base plate 14 where the guiding walls 18 are positioned is moved towards the hitch bar 13, while the area of the base plate 14 that contains the hitch ball 12 is moved upward towards the trailer 8 and the trailer socket 10. This action can be clearly seen in FIGS. 3b–3f. As the hitch ball 12 is moved upward, it continues toward the direction of the trailer socket 10, until the hitch ball 12 is completely coupled inside the trailer socket 10 (as shown in FIGS. 1 and 2).

A locking tab 26 may be attached to the bottom of the base plate 14, as shown in FIG. 1. The locking tab 26 extends from the base plate 14 towards the hitch bar 13 when the base plate 14 is in the final, locked position. More specifically, a locking tab hole 28 is positioned through the hitch bar 13 when the base plate 14 is in the final position. The locking tab 26 further includes a locking pin hole 30 which, when the base plate 14 is in the final position, the locking pin hole 30 will be located below the hitch bar 13. Therefore, a locking pin 60 (as shown in FIG. 5) or other locking device can be inserted through the locking pin hole 30, which will prevent the base plate 14 from further pivoting with respect to the hitch bar 13.

The automatic hitch coupler 2 also includes a latch 34 and a latch receiver 36 for securing the base plate 14 to the hitch bar 13 when the base plate 14 is in the final position. In the preferred embodiment, the latch 34 is located in the end of the base plate 14. The latch 34 includes a strike pin 38 that in the preferred embodiment has a flat end and an angled end. The latch 34 also includes a strike pin spring 40, which is positioned between the strike pin 38 and the base plate 14. The strike pin spring 40 applies pressure to the strike pin 38 so that the strike pin 38 will extend toward the latch receiver 36 to engage the latch receiver 36 when the base plate 14 moves from the receiving position shown in FIG. 3a to the final position shown in FIG. 1. In one embodiment, the latch 34 also includes a strike pin arm 44 that is attached to the strike pin 38. The strike pin arm 44 extends through a strike pin release hole 42 that is positioned in the side of the base plate 14. The strike pin release hole 42 preferably is oval in shape, thereby allowing the strike pin release arm 44 to travel laterally so as to move the strike pin 38. This thereby allows the strike pin 38 to engage and disengage the latch receiver 36 so as to lock and unlock the base plate 14 in the final position. The latch receiver 36 preferably is a strike pin receiving hole that is positioned in the hitch bar 13 so that the base plate 14 will be level with the hitch bar 13 when the latch 34 engages the latch receiver 36. In another embodiment shown in FIG. 4, the latch receiver 36 can include a strike pin receiving tab 47 having a strike pin receiving hole 48. The strike pin receiving tab 47 is mounted to the hitch bar 13. The strike pin receiving tab 47 with the strike pin receiving hole 38 that allows the base plate 14 to be parallel and near to the hitch bar 13 when the latch 34 engages the latch receiver 36.

Figure 6:
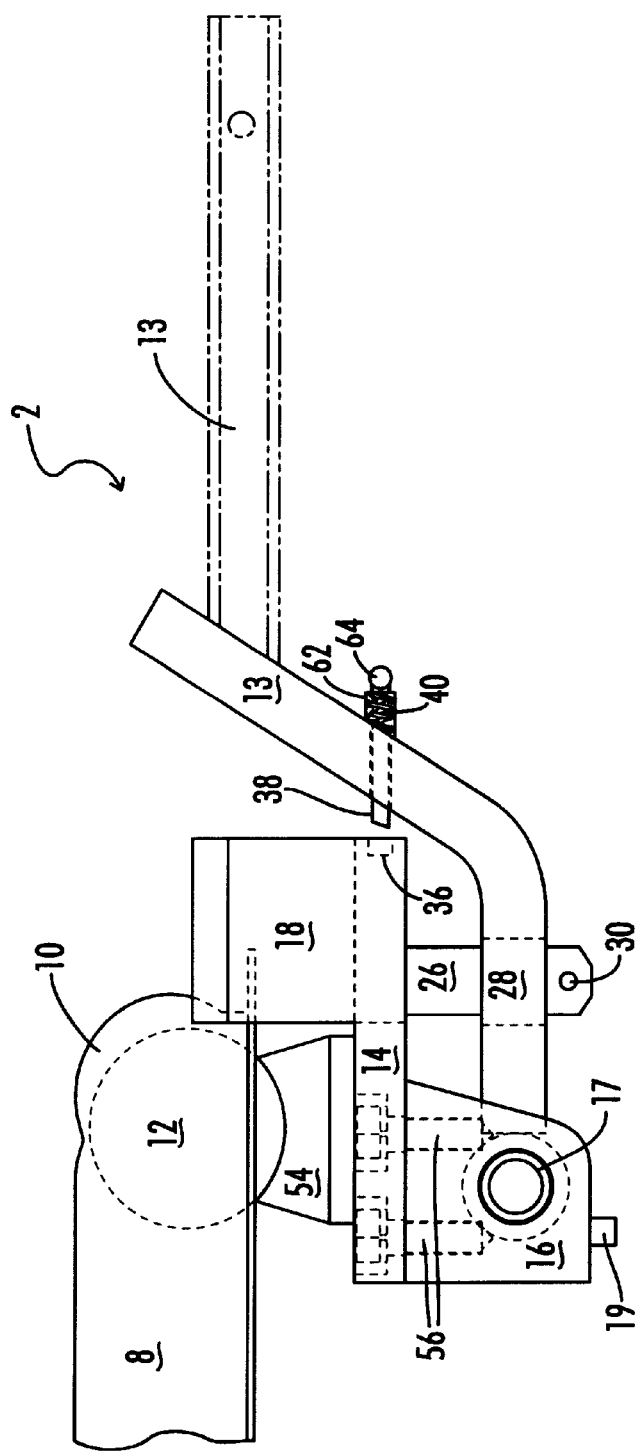
FIG. 6 is a side view of the automatic hitch coupler showing the strike pin mounted through the hitch bar.

In a second embodiment of the latch system, as shown in FIG. 6, the latch 34 and latch receiver 36 are mounted in different positions a long the automatic hitch coupler 2. The strike pin 38 extends through the hitch bar 13 and latch receiver 36 may be installed inside the base plate 14. The strike pin 38 is held in position by a strike pin holding cylinder 62 mounted to the inside surface of the hitch bar 13, whereby the strike pin spring 40 is positioned between the holding cylinder 62 and the strike pin 38. The strike pin 38 is thereby directed toward the base plate 14 to engage the latch 34 when the base plate 14 is pivoted to the locked position. The strike pin 38 can be released from the later by pulling the pin handle 64.

Thus although there have been described particular embodiments of the present invention of the new and useful automatic hitch coupler, it is not intended that such references be construed as limitations upon the scope of the invention as set forth in the following claims.

What is claimed is:

1. An apparatus for coupling a downwardly open trailer socket with an upwardly extending hitch ball, the apparatus comprising:
   a hitch bar having a first and second end; and
   a base plate pivotally connected to the first end of the hitch bar for pivotal movement about a generally horizontal axis, the base plate adapted to have the hitch ball attached to the base plate;
   a pivot stop surface defined on the base plate for engaging the hitch bar and preventing further downward pivotal movement of the base plate thereby defining a receiving position for receiving the trailer socket; and
   wherein the base plate is pivotable between the receiving position wherein the base plate is adapted to receive the trailer socket and to define a lower position of the hitch ball, and a final position wherein the base plate is adapted to secure the trailer socket with the hitch ball and to define an upper position of the hitch ball, so that the base plate is adapted to swing the hitch ball upward through an arc into engagement with the downwardly open trailer socket as the base plate pivots between its receiving osition and its final position.

2. The apparatus of claim 1 further comprising a pair of guiding walls, the guiding walls being Attached to the base plate for pivotal movement with the base plate, the guiding walls are adapted to direct the trailer socket over the downwardly open hitch ball when the trailer socket engages the guiding walls when the base plate is in the receiving position and the base plate is pivoted from the receiving position to the final position.

3. The apparatus of claim 1 further comprising a locking tab, the locking tab being attached to the base plate and extending toward the hitch bar when the base plate is in the final position.

4. The apparatus of claim 1 further comprising a latch and a latch receiver, the latch and latch receiver locking the base plate in the final position.

5. A trailer hitching apparatus for engaging a trailer having a trailer socket the apparatus comprising:
   a hitch bar having a first and second end;
   a base plate being pivotally connected to the first end of the hitch bar for pivotal movement about a horizontal axis; and
   a hitch ball attached to the base plate;
   wherein the base plate is pivotable relative to the hitch bar between a receiving position for contacting the trailer socket and a final position wherein the hitch ball is coupled with the trailer socket, the base plate pivoting from the receiving position to the final position when engaged by the trailer socket, the ball extending generally horizontally when the base plate is in the receiving position, and the ball extending generally vertically when the base plate is in the final position.

6. The apparatus of claim 5 further comprising a pair of guiding walls, the guiding walls being connected to the base plate, the guiding walls positioning the trailer socket onto the hitch ball when the base plate moves from the receiving position to the final position.

7. The apparatus of claim 5 further comprising a locking means to secure the base plate in the final position.

8. The apparatus of claim 7, the locking means further comprising a latch and latch receiver, the latch mounted in the base plate.

9. The apparatus of claim 7, the locking means further comprising:
   a locking tab attached to the base plate and having a locking pin hole;
   and a locking pin;
   the hitch bar further having a locking tab hole; and
   the locking tab extending through the locking tab hole when the base plate is in the final position;
   the locking pin hole extending below the hitch bar when the base plate is in the final position to receive the locking pin.

10. The apparatus of claim 5, wherein:
    the receiving position of the base plate defines a lower position of the hitch ball, and the final position of the base plate defines an upper position of the hitch ball, so that the hitch ball moves upward as the base plate pivots from its receiving position to its final position.

11. An apparatus for coupling a trailer socket with a hitch ball, the apparatus comprising:
    a hitch ball having a first and second end;
    a base plate pivotally connected to the first end of the hitch ball, the base plate adapted to have the hitch ball attached to the base plate;
    wherein the base plate is pivotable relative to the hitch bar between a receiving position for receiving the trailer socket and a final position for securing the trailer socket with the hitch ball, the base plate pivoting from the receiving position to the final position when engaged by the trailer socket;
    a locking tab, the locking tab being attached to the base plate and extending toward the hitch bar when the base plate is in the final position; and
    wherein the hitch bar comprises a locking tab hole, the locking tab hole positioned to correspond with the lock tab, the locking tab traversing the locking tab hole when the base plate is in the final position.

12. The apparatus of claim 11 wherein the locking tab further comprises a locking pin hole, the locking pin hole being positioned below the hitch bar when the base plate is in the final position.

13. The apparatus of claim 12 further comprising a locking pin, the locking pin being the size to fit through the locking pin hole, the locking pin preventing the base plate from being able to pivot when inserted through the locking pin hole in the final position.

14. An apparatus for coupling a trailer socket with a hitch ball, the apparatus comprising:

a hitch bar having a first and second end;

a base plate pivotally connected to the first end of the hitch bar, the base plate adapted to have the hitch ball attached to the base plate;

wherein the base plate is pivotable relative to the hitch bar between a receiving position for receiving the trailer socket and a final position for securing the trailer socket with the hitch ball, the base plate pivoting from the receiving position to the final position when engaged by the trailer socket;

a latch and a latch receiver, the latch and latch receiver locking the base plate in the final position, the latch including:
- a strike pin having a first and a second end;
- a strike pin spring contacting the first end of the strike pin to push the strike pin toward the latch receiver; and
- the second end of the strike pin spring serving to engage the latch receiver to lock the base plate in the final position.

15. The apparatus of claim 14 wherein the latch further comprises:
- a strike pin release hole in the side of the base plate; and
- a strike pin arm attached to the strike pin, the strike pin arm extending through the strike pin release hole thereby allowing the strike pin to disengage the latch receiver.

16. The apparatus of claim 14 further comprising a pin handle attached to the strike pin, the pin handle allowing the strike pin to disengage the latch receiver when the pin handle is pulled in a direction opposite the latch receiver.

17. The apparatus of claim 14 wherein the latch receiver comprises a strike pin receiving hole positioned in the hitch bar.

18. The apparatus of claim 14 wherein the latch receiver comprises:
- a strike pin receiving tab mounted to the hitch bar; and
- a strike pin receiving hole positioned on the strike pin receiving tab.

* * * * *

UNITED STATES PATENT AND TRADEMARK OFFICE
CERTIFICATE OF CORRECTION

PATENT NO.    : 6,164,681
DATED         : December 26, 2000
INVENTOR(S)   : Grammer It is certified that error appears in the above-identified patent and that said Letters Patent is hereby corrected as shown below:

Claim 1,
Last line, change "osition" to -- position --.

Claim 2,
Second line, change "Attached" to -- attached --.

Claim 11,
Third line, change "ball" to -- bar --.
Fifth line, change "ball", first occurrence, to -- bar --.

Signed and Sealed this

Twenty-fifth Day of September, 2001

Attest:

NICHOLAS P. GODICI
Attesting Officer         Acting Director of the United States Patent and Trademark Office